(12) United States Patent
Turney

(10) Patent No.: US 6,801,674 B1
(45) Date of Patent: Oct. 5, 2004

(54) REAL-TIME IMAGE RESIZING AND ROTATION WITH LINE BUFFERS

(75) Inventor: Robert D. Turney, Watertown, WI (US)

(73) Assignee: Xilinx, Inc., San Jose, CA (US)

( * ) Notice: Subject to any disclaimer, the term of this patent is extended or adjusted under 35 U.S.C. 154(b) by 621 days.

(21) Appl. No.: 09/943,547

(22) Filed: Aug. 30, 2001

(51) Int. Cl.⁷ .................................................. G06K 9/32
(52) U.S. Cl. .................... 382/298; 382/296; 382/299; 348/580; 348/583
(58) Field of Search ........................ 382/282, 289, 382/296, 297, 298, 299, 300, 305; 358/426.05, 451, 453; 348/580, 581, 583

(56) References Cited

U.S. PATENT DOCUMENTS

| | | | | |
|---|---|---|---|---|
| 4,989,091 A | * | 1/1991 | Lucas | 348/458 |
| 5,384,600 A | * | 1/1995 | Kaizaki et al. | 348/556 |
| 5,671,018 A | * | 9/1997 | Ohara et al. | 348/452 |
| 5,917,554 A | * | 6/1999 | Ohta | 348/581 |

* cited by examiner

*Primary Examiner*—Bhavesh M. Mehta
*Assistant Examiner*—Yosef Kassa
(74) *Attorney, Agent, or Firm*—LeRoy D. Maunu

(57) ABSTRACT

Circuit arrangements and methods for real-time image resizing and image rotation. Line buffers are used for storage of lines of pixel values for both resizing and rotation. A first one of the line buffers receives input pixel values, and the line buffers are coupled in a chain such that line buffer i receives pixel values from line buffer i−1. The lines of pixel values are moved from line buffer i to line buffer i+1 as the pixel values are processed for resizing or rotation.

24 Claims, 5 Drawing Sheets

REAL-TIME IMAGE RESIZING AND ROTATION WITH LINE BUFFERS

FIELD OF THE INVENTION

The present invention generally relates to digital image processing, and more particularly to resizing and rotation of digital images.

BACKGROUND

An example programmable logic device (PLD) is the field programmable gate array (FPGA), first introduced by Xilinx, Inc., in 1985. PLDs such as FPGAs are becoming increasingly popular for use in electronics systems. For example, multimedia communications systems employ FPGAs in large measure for their re-programmability. In general, the use of FPGAs continues to grow at a rapid rate because they permit relatively short design cycles, reduce costs through logic consolidation, and offer flexibility in their re-programmability.

Advances in semiconductor process technology are delivering FPGAs having logic densities in the range of a million system gates and having operating speeds in excess of 200 MHz. These powerful devices are capable of and have been used to implement digital signal processing (DSP) algorithms which are inherently parallel and normally require multiple DSP microprocessors in order to accommodate the high data rates. It is feasible to implement such algorithms on a single FPGA because such devices offer a programmable architecture.

Image resizing typically involves fractional re-sampling, which can lead to prohibitively large implementations and result in compromises in range and resolution. Polyphase decimators and polyphase interpolators are generally employed for fractional re-sampling, depending on whether an image is being reduced (decimator) or enlarged (interpolator).

In many two-dimensional resizing implementations, an intermediate buffer is disposed between horizontal and vertical filter elements. The structure has considerable memory requirements because the size of the intermediate buffer is doubled relative to the image size to support continuous operation.

Image rotation also involves re-sampling, but is performed on non-integer points. For example, with a center point of an image defined, a single parameter • specifies the transformation. The equations below provide the coordinate transformation in terms of rotation of the coordinate axis.

$S_x = D_x \cos(\bullet) + D_y \sin(\bullet)$ $S_y = -D_x \sin(\bullet) + D \cos(\bullet)$ where S and D represent source and destination coordinates, respectively.

In an implementation having linear addressing through the destination image, the first step in the rotation algorithm is computation of the source values $S_x$ and $S_y$. From these values, the neighborhood of pixels is known for the filter operation. The location of the destination pixels in the source pixel matrix also gives the weighting factors for bilinear or bicubic interpolation. The pixel value is then calculated with the weighting factors and pixel values in the neighborhood. The process repeats by incrementing the $D_x$ value and continuing in a raster out format. One drawback of this process is the non-uniform addressing of the source pixels. Essentially, the input memory design must have four times the bandwidth (or 16 for bicubic) because there is no sharing of source pixels between destination pixel operations.

Given the speed and flexibility of FPGAs, it would be desirable to implement image resize and rotation circuitry on an FPGA. However, memory bandwidth and frame latency issues must be factored into any solution.

SUMMARY OF THE INVENTION

The invention provides circuit arrangements and methods for real-time image resizing and image rotation. In various embodiments, line buffers are used for storage of lines of pixel values for both resizing and rotation. A first one of the line buffers receives input pixel values, and the line buffers are coupled in a chain such that line buffer i receives pixel values from line buffer i−1. The lines of pixel values are moved from line buffer i to line buffer i+1 as the pixel values are processed for resizing or rotation.

The line buffers offer improved performance in real-time image resizing by eliminating the need to re-read sample values from a memory. The line buffers further eliminate the need for the added memory of a double buffering approach and introduce no frame latency. For image rotation, the line buffers allows the source pixels to be shared and linearly addressed in generating destination pixels. This greatly reduces the memory requirements for a given bandwidth requirement.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
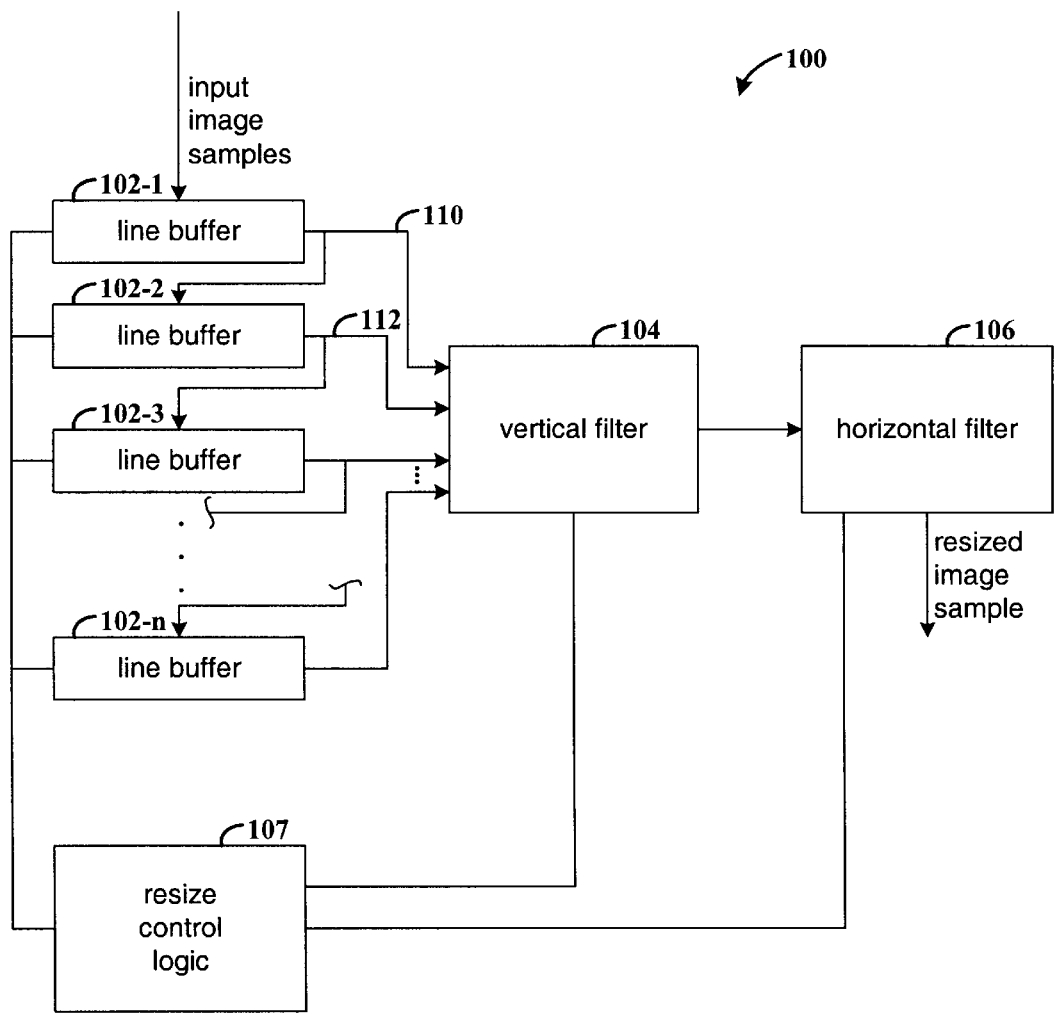
FIG. 1 is a functional block diagram of a circuit arrangement for real-time resizing of a digital image in accordance with one embodiment of the invention.

FIG. 1 is a functional block diagram of a circuit arrangement for real-time resizing of a digital image in accordance with one embodiment of the invention. Circuit arrangement 100 inputs a single row and performs the vertical filtering with the "Q" sequencer changing on a row basis. Depending on the vertical down-sample rate, throw-away lines are possible. Similarly, repeated lines are needed when up-sampling.

Resizing circuitry 100 includes multiple line buffers 102-1–102-n for buffering lines of image data, with output values from each of the line buffers being input to vertical filter 104. Each line buffer stores one row of sample (pixel) values for an image. The output value from the vertical filter is input to horizontal filter 106. Resized image samples are output from the horizontal filter. Resize control logic 107 controls sequencing of input sample values to the line buffers, reading sample values from the line buffers, controlling operation of the vertical and horizontal filters, and indicating when resized image samples are valid.

Corresponding sample values are read in parallel from the line buffers 102-1–102-n and input to vertical filter 104. When a value from a line buffer is read and input to vertical filter 104, the same value is input and written to the appropriate location in the next line buffer in the chain. For example, when the first value is read from line buffer 102-1 and input to the vertical filter on line 110, the same first value is also written to the corresponding position in line buffer 102-2, which at the same time is providing a first value on line 112 to the vertical filter and to line buffer 102-3.

By shifting a row of image samples from one line buffer to the next, the structure offers improved performance in real-time image resizing by eliminating the need to re-read sample values from memory. In addition, the line buffers eliminate the need for the added memory of the double buffering approach. Furthermore, there is no frame latency in the current arrangement.

In one embodiment, vertical filter 104 and horizontal filter 106 are implemented using conventional logic. For example, the vertical filter includes an array of multipliers (not shown), with each multiplier receiving an input sample value input from one of the line buffers and a coefficient. The output values from the multipliers are input to an adder tree (not shown). The output data from the vertical filter are input to the horizontal filter, which includes a series of delay elements, an array of multipliers, and an adder tree. Those skilled in the art will appreciate that in other embodiments, vertical and horizontal filters can be specially constructed to satisfy application requirements.

Figure 2:
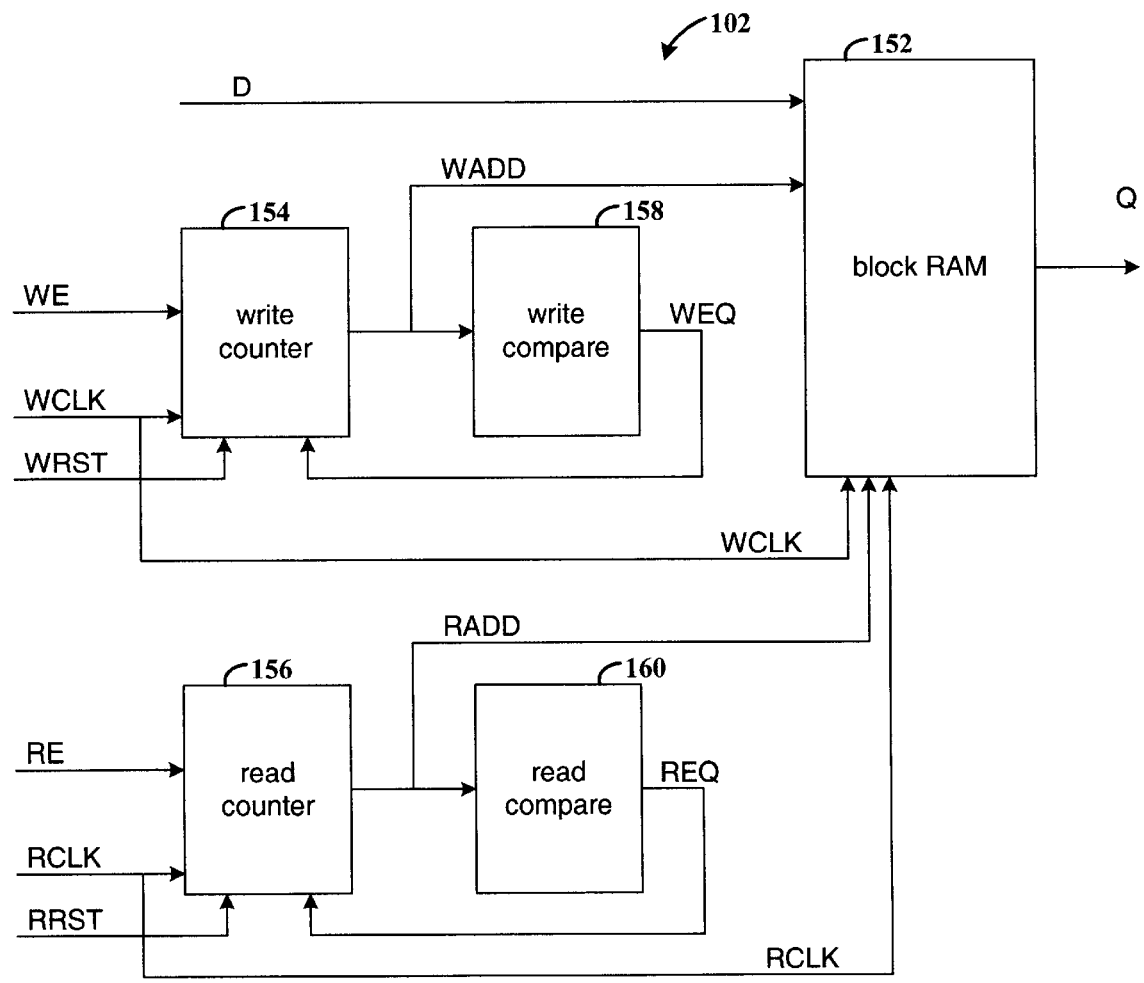
FIG. 2 is a functional block diagram of an example line buffer.

FIG. 2 is a functional block diagram of an example line buffer 102. In one embodiment, the line buffer is implemented in an field programmable gate array (FPGA) configured with a block RAM. Those skilled in the art will appreciate that in other embodiments, other programmable logic devices (PLDs) or ASICs could be used to implement one or more line buffers.

Line buffer 102 includes block RAM 152, which functions as a dual port RAM that is controlled by write counter 154 and read counter 156. In the present application, block RAM refers in one embodiment to RAM implemented on FPGA, for example, the block RAM supported in FPGAs from Xilinx.

The write counter and read counter increment address values (WADD and RADD) that are provided to write address and read address ports of the block RAM. The write compare circuit 158 and read compare circuit 160 compare the WADD and RADD values from the counters with selected address thresholds. When the WADD value reaches the corresponding threshold, the write compare circuit 158 signals the write counter with the WEQ signal. Similarly, when the RADD value reaches the corresponding threshold, the read compare circuit 160 signals the read counter with the REQ signal. Active WEQ and write reset (WRST) signals to the write counter reset the write counter, and active REQ and read reset (RRST) signals reset the read counter. The write counter and writes to the block RAM are clocked by the write clock (WCLK), and the read counter and reads from the block RAM are clocked by the read clock (RCLK).

The write counter is enabled with the WE signal, which in an example video application is the horizontal synchronization signal. The read counter is enabled by the RE signal and is one address ahead of the write counter.

Figure 3:
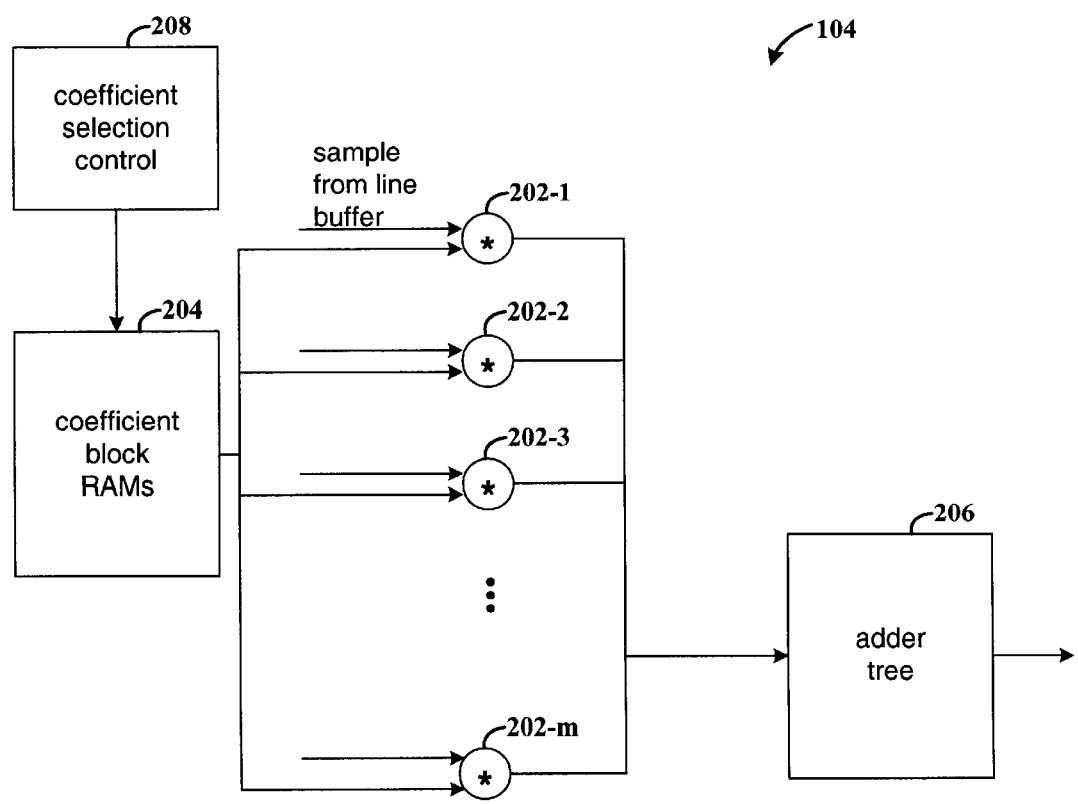
FIG. 3 is a functional block diagram of an example vertical filter component.

FIG. 3 is a functional block diagram of an example vertical filter 104. Those skilled in the art will recognize vertical filter 104 as a FIR filter. Vertical filter 104 includes an array of multipliers 202-1–202-m coupled to one or more coefficient block RAMs 204. The number of multipliers is equal to the number of vertical taps in the filter and determined by resize factors and image quality assessment. Each multiplier inputs a sample value from a line buffer and a coefficient selected from the block RAM 204. The output values from the multipliers are input to adder tree 206, which provides an input value to the horizontal filter 106.

The coefficient block RAM(s) provide different sets of coefficients for different resizing requirements. For example, if the resizing involves down-sampling by an odd number, different sets of coefficients are used depending on which line is in process. Coefficient selection control 208 reads the appropriate coefficients from block RAM 204 for input to the multipliers 202-1–202-m.

Figure 4:
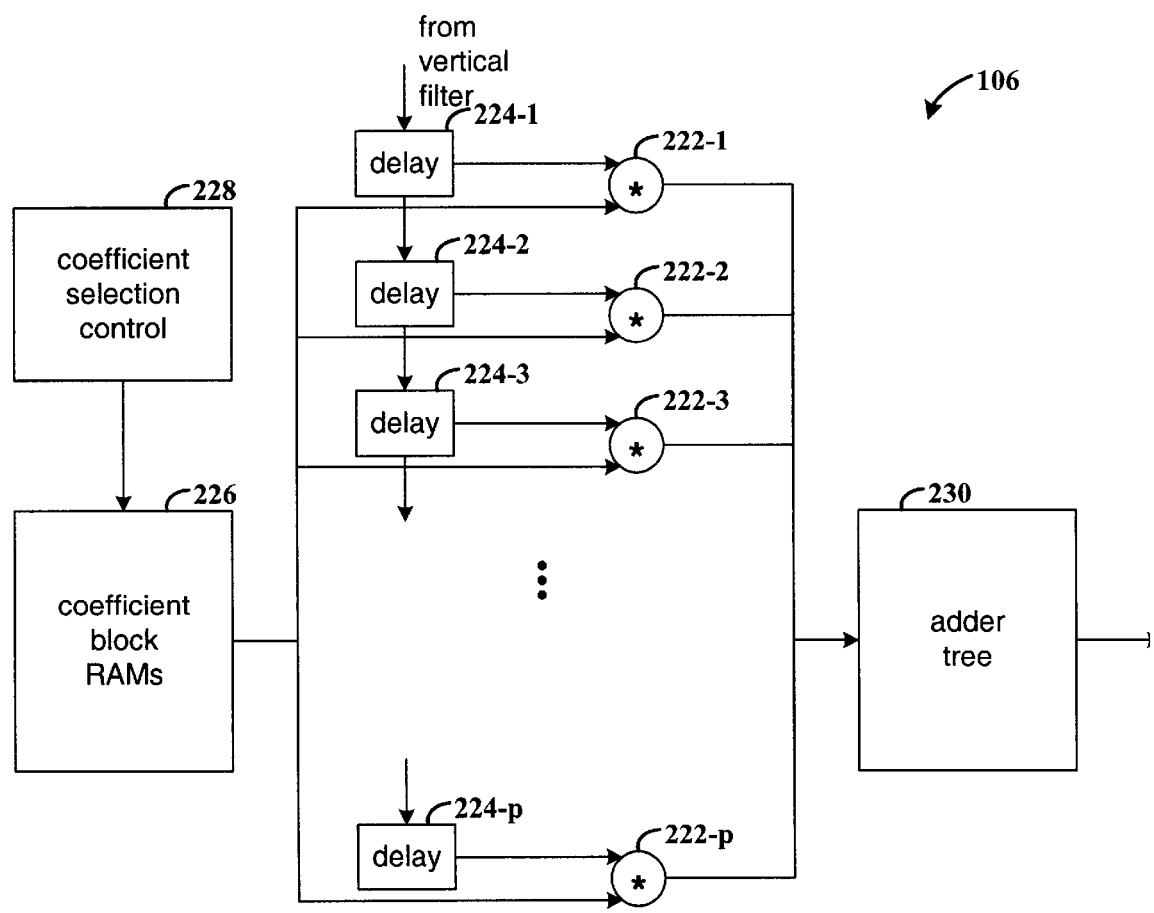
FIG. 4 is a functional block diagram of an example horizontal filter component.

FIG. 4 is a functional block diagram of an example horizontal filter component. Those skilled in the art will recognize horizontal filter 106 as a multi-rate one-dimensional FIR filter in which coefficients change on a pixel-by-pixel basis.

Horizontal filter 106 includes an array of multipliers 222-1–222-p that receive as input values, delayed values output from the vertical filter (delay elements 224-1–224-p) and coefficient values selected from coefficient block RAM(s) 226. As with the vertical filter 104, the number of multipliers is equal to the number of horizontal taps in the filter and determined by resize factors and image quality assessment. Coefficient selection control 228 reads the appropriate coefficients from block RAM 226 for input to the multipliers 222-1–222-p. The coefficients are selected pixel-by-pixel based on the resize factor and position in the image. The output values from multipliers 222-1–222-p are input to adder tree 230, and the output value from the adder tree is the resized output sample.

Figure 5:
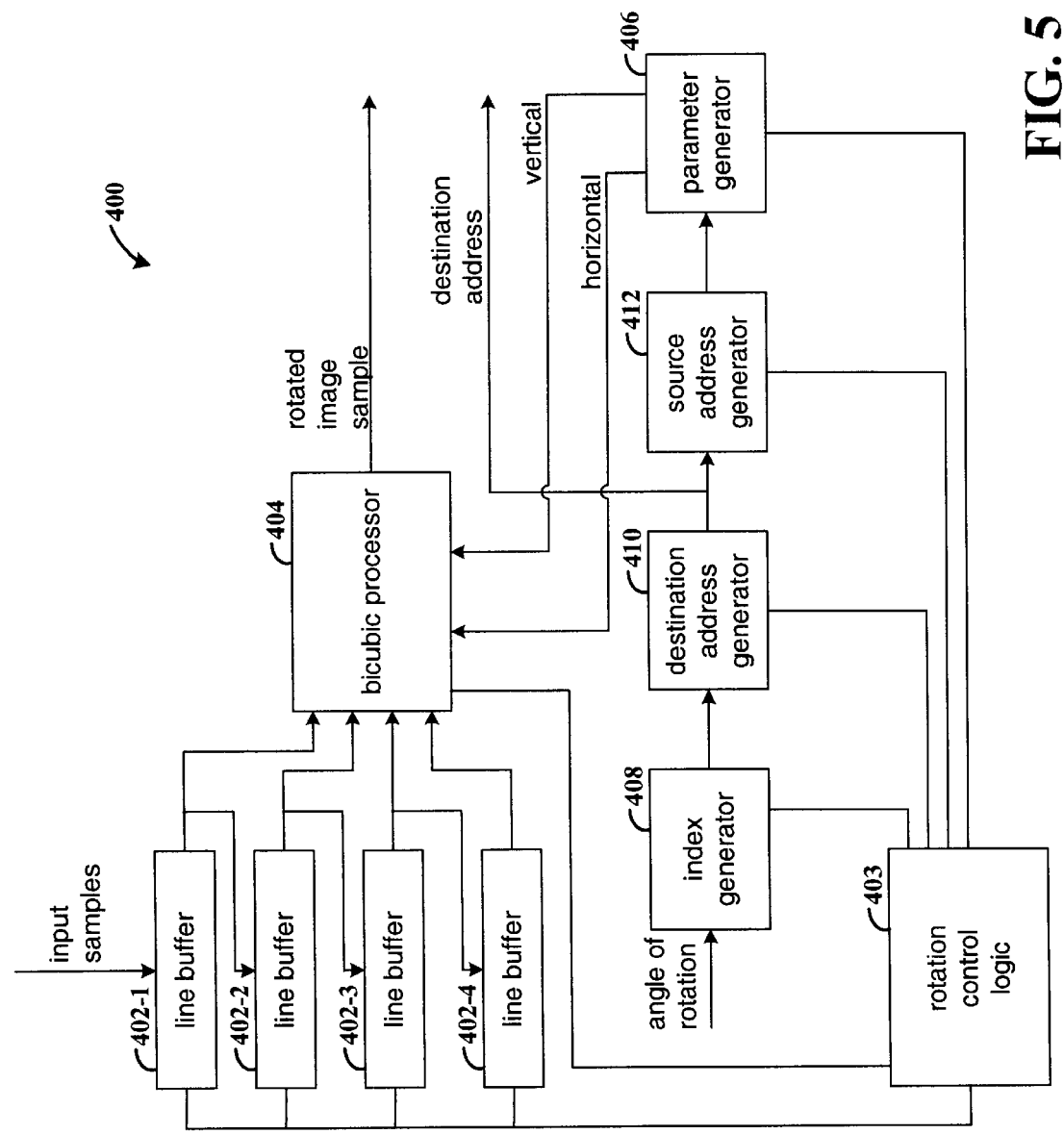
FIG. 5 is a functional block diagram of a circuit arrangement for real-time rotation of a digital image in accordance with one embodiment of the invention.

FIG. 5 is a functional block diagram of a circuit arrangement for real-time rotation of a digital image in accordance with one embodiment of the invention. Circuit arrangement 400 linearly addresses pixels in the source image while generating the rotated image. The arrangement of line buffers 402-1–402-4 stores the image to be rotated and allows the source pixels to be shared in generating destination pixels. This greatly reduces the memory requirements for a given bandwidth requirement. Rotation control logic 403 controls sequencing of input sample values to the line buffers, reading sample values from the line buffers, controlling operation of the various elements of the circuit arrangement 400, and indicating when rotated image samples are valid.

With a center point of an image defined, a single parameter • specifies the transformation. The equations below provide the coordinate transformation in terms of rotation of the coordinate axis.

$$S_x = D_x \cos(\bullet) + D_y \sin(\bullet)$$
$$S_y = -D_x \sin(\bullet) + D_y \cos(\bullet)$$

where S and D represent source and destination coordinates, respectively. By inverting the equations, the destination coordinates are obtained, which can be truncated to find $D_x$ and $D_y$ values. The values are reiterated into the equations and used to calculate weighting factors for bicubic interpolation in the neighborhood of the available source pixels.

For image rotation, re-sampling interpolation is typically limited to 4×4 pixel neighborhoods for reasons of computational complexity. Thus, circuit arrangement 400 includes 4 line buffers 402-1–402-4, each having sample values for 4 pixels. Each of line buffers 402-1–402-4 is implemented in one embodiment with the line buffer arrangement 102 of FIG. 2. The line buffers are filled with sample values in the manner described above for image resizing.

Where F(p, q) is the nearest neighbor to a pixel to be interpolated (p is the row, and q is the column), a general bicubic (4×4) interpolation neighborhood is used to populate line buffers 402-1–402-4. Line buffer 402-1 stores row (p−1), line buffer 402-2 stores row p, line buffer 402-3 stores row (p+1), and line buffer 402-4 stores row (p+2).

As described in "Digital Image Processing", $2^{nd}$ edition, William Pratt (John Wiley and Sons), the interpolated pixel can be expressed in the form:

$$F(p',q') = SUM_{m=-1,2}(SUM_{n=-1,2}(F(p+m, q+n)R_c[(m-a)]R_c[-(n-b)]))$$

where a and b are the differences between the rows and columns of F(p,q) and F(p',q'), respectively, and $R_c$ denotes a bicubic interpolation function such as a cubic B-spline or cubic interpolation function. Bicubic processor 404 computes interpolated pixel values using selected input values from the line buffers and horizontal and vertical parameter values from parameter generator 406. The horizontal parameter value corresponds to the $R_c[(m-a)]$ component, and the vertical parameter value corresponds to the $R_c[-(n-b)]$ component of the function set forth above.

The angle of rotation is input to index generator 408. The index generator computes the present position in the raster scan and provides the position data to the destination address generator. By inverting the constitutive trigonometric equations the destination coordinates are obtained which can be truncated to find integer $D_x$ and $D_y$ values. These values are reiterated into the equation and used to calculate weighting factors for bilinear or bicubic interpolation in the neighborhood of source pixels available. Rastering through the input image with this procedure fills in the resultant rotated image.

The destination address generator 410 receives an input value from the index generator and computes a destination address. The destination address indicates a pixel position in a raster image for the rotated image sample value from the bicubic processor.

The destination address is input to the source address generator 412 in order to pass along the distances from destination to source points so that parameters can be calculated. The source address generator determines a location and distance off grid of the new output pixel in the source image. It will be appreciated that the new output value is in the destination image, and "location in the source image" refers to the overlay of the destination grid relative to the source grid during rotation. Values for the location and distance are provided to the parameter generator 406.

In one embodiment, bicubic processor 404, parameter generator 406, index generator 408, destination address generator 410, and source address generator 412 function in accordance with known techniques for rotating images. In other embodiments, the components can be adapted for application-dependent image rotation requirements. FPGAs are suitable for implementing the image-rotation circuit arrangement 400. Alternatively, the circuit can be implemented as an ASIC.

It is intended that the specification and illustrated embodiments be considered as examples only, with a true scope and spirit of the invention being indicated by the following claims.

What is claimed is:

1. A circuit arrangement for real-time image resizing, comprising:
   a plurality of line buffers, a first one of the line buffers having an input port arranged to receive input sample pixel values, and each of the other line buffers having an input port coupled to an output port of another one of the line buffers;
   a vertical filter arrangement coupled to output ports of the line buffers;
   a horizontal filter unit having an input port coupled to the vertical filter; and
   a controller coupled to the line buffers, vertical filter, and horizontal filter, the controller configured and arranged to select sample pixel values from the line buffers for input in parallel to the vertical filter and move sample pixel values from one line buffer to another.

2. The circuit arrangement of claim 1, wherein the controller is further configured and arranged to select a set of coefficient values from a first plurality of sets of coefficient values for application by the vertical filter for each line in the image.

3. The circuit arrangement of claim 2, wherein the controller is further configured and arranged to select a set of coefficient values from a second plurality of sets of coefficient values for application by the horizontal filter for each sample pixel value in the image.

4. The circuit arrangement of claim 3, wherein the first plurality and second plurality of sets of coefficient values are stored in a RAM implemented in a programmable logic device.

5. The circuit arrangement of claim 3, wherein each of the line buffers comprises a RAM implemented in a programmable logic device.

6. The circuit arrangement of claim 1, wherein each of the line buffers comprises a RAM implemented in a programmable logic device.

7. A method for real-time image resizing, comprising:
   storing input sample pixel values in a first line buffer, wherein the first line buffer is one of n line buffers, n>1, arranged for storage of respective lines of sample pixel values, each line buffer i, 1<=i<n, having an output port coupled to an input port of line buffer i+1;
   applying a vertical filter to selected sample pixel values from line buffers 1 through n;
   moving lines of pixel data from line buffer i to line buffer i+1 as the sample pixel values are vertically filtered; and
   applying a horizontal filter to output data from the vertical filter whereby pixel values for a resized image are output.

8. The method of claim 7, further comprising selecting a set of coefficient values from a first plurality of sets of coefficient values for application by the vertical filter for each line in the image.

9. The method of claim 8, further comprising selecting a set of coefficient values from a second plurality of sets of coefficient values for application by the horizontal filter for each pixel in the image.

10. The method of claim 9, further comprising storing the first plurality and second plurality of sets of coefficient values in a RAM implemented in a programmable logic device.

11. The method of claim 8, further comprising writing sample pixel values to and reading sample pixel values from the line buffers that are implemented in RAM on a programmable logic device.

12. An apparatus for real-time image resizing, comprising:
  means for storing input sample pixel values in a first line buffer, wherein the first line buffer is one of n line buffers, n>1, arranged for storage of respective lines of sample pixel values, each line buffer i, 1<=i<n, having an output port coupled to an input port of line buffer i+1;
  means for applying a vertical filter to selected sample pixel values from line buffers 1 through n;
  means for moving lines of pixel data from line buffer i to line buffer i+1 as the sample pixel values are vertically filtered; and
  means for applying a horizontal filter to output data from the vertical filter whereby pixel values for a resized image are output.

13. A circuit arrangement for real-time image rotation, comprising:
  a plurality of line buffers arranged for storage of a source image, a first one of the line buffers having an input port arranged to receive input sample pixel values, and each of the other line buffers having an input port coupled to an output port of another one of the line buffers; and
  a bicubic calculation circuit arrangement coupled to the output ports of the line buffers, the bicubic calculation circuit arrangement configured and arranged to linearly address sample pixel values in the source image and translate the sample pixel values from the source image to rotated image sample pixel values in a destination image.

14. The circuit arrangement of claim 13, wherein the bicubic calculation circuit arrangement is configured to select bicubic weights with each sample pixel value in the source image for use in translating each sample pixel value.

15. The circuit arrangement of claim 13, wherein each of the line buffers comprises a RAM implemented in a programmable logic device.

16. A circuit arrangement for real-time image rotation, comprising:
  a plurality of line buffers, a first one of the line buffers having an input port arranged to receive input sample pixel values, and each of the other line buffers having an input port coupled to an output port of another one of the line buffers;
  a bicubic processing unit having a plurality of input ports coupled to the output ports of the line buffers;
  an index generator arranged to receive a value indicative of a rotation angle, the index generator configured to calculate a current location in a raster scan;
  a destination address generator coupled to the index generator and configured to determine an address for an output pixel value in response to the current location in the raster scan;
  a source address generator coupled to the destination address generator and configured to determine a location value and a distance value indicative of a location and distance off-grid of the output pixel value;
  a parameter generator coupled to the source address generator and having an output port coupled to the bicubic processing unit, the parameter generator configured to determine bicubic weight values for input to the bicubic processing unit in response to the location and distance values; and
  a controller coupled to the line buffers, bicubic processing unit, index generator, destination address generator, source address generator, and parameter generator, the controller configured and arranged to select sample pixel values from the line buffers for input in parallel to the vertical filter and move sample pixel values from one line buffer to another.

17. The circuit arrangement of claim 16, wherein the controller is configured to linearly address sample pixel values in the line buffers.

18. The circuit arrangement of claim 16, wherein the line buffers hold four lines of sample data.

19. The circuit arrangement of claim 16, wherein the controller is configured to select bicubic weights with each sample pixel value.

20. The circuit arrangement of claim 16, wherein each of the line buffers comprises a RAM implemented in a programmable logic device.

21. A method for real-time image rotation, comprising:
  storing input sample pixel values in a first line buffer, wherein the first line buffer is one of n line buffers, n>1, arranged for storage of respective lines of sample pixel values, each line buffer i, 1<=i<n, having an output port coupled to an input port of line buffer i+1;
  applying a bicubic interpolation function to selected sample pixel values from line buffers 1 through n, whereby sample pixel values for a rotated image are generated; and
  moving lines of sample pixel values from line buffer i to line buffer i+1 as the sample pixel values are interpolated.

22. The method of claim 21, further comprising:
  generating a current location value indicating a current location in a raster scan in response to an input value indicative of a rotation angle;
  determining an address for an output pixel value in response to the current location value;
  determining a location value and a distance value indicative of a location and distance off-grid of the output pixel value in response to the current location value; and
  determining bicubic weight values for use in bicubic interpolation in response to the location and distance values.

23. The method of claim 21, further comprising writing sample pixel values to and reading sample pixel values from the line buffers that are implemented in RAM on a programmable logic device.

24. An apparatus for real-time image rotation, comprising:
  means for storing input sample pixel values in a first line buffer, wherein the first line buffer is one of n line buffers, n>1, arranged for storage of respective lines of sample pixel values, each line buffer i, 1<=i<n, having an output port coupled to an input port of line buffer i+1;
  means for bicubic interpolation of selected sample pixel values from line buffers 1 through n, whereby pixel values for a rotated image are generated; and
  means for moving lines of sample pixel values from line buffer i to line buffer i+1 as the sample pixel values are interpolated.

* * * * *